United States Patent
Park et al.

(10) Patent No.: US 10,071,721 B2
(45) Date of Patent: Sep. 11, 2018

(54) CONTROL METHOD AND APPARATUS OF HYBRID ELECTRIC VEHICLE

(71) Applicants: Hyundai Motor Company, Seoul (KR); Kia Motors Corporation, Seoul (KR)

(72) Inventors: Dae Ro Park, Gyeonggi-do (KR); Jin Woo Cho, Gyeonggi-do (KR); Seung Ho Lee, Gyeonggi-do (KR); Hyun Min Park, Gyeonggi-do (KR); Hae Seung Lee, Gyeonggi-do (KR); Ji Yeol Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 26 days.

(21) Appl. No.: 15/180,143

(22) Filed: Jun. 13, 2016

(65) Prior Publication Data
US 2017/0240160 A1    Aug. 24, 2017

(30) Foreign Application Priority Data
Feb. 22, 2016  (KR) .................. 10-2016-0020656

(51) Int. Cl.
*B60W 20/10*    (2016.01)
*B60W 10/08*    (2006.01)

(52) U.S. Cl.
CPC ............ *B60W 20/10* (2013.01); *B60W 10/08* (2013.01)

(58) Field of Classification Search
CPC ...... B60W 20/10; B60W 10/08; B60W 20/50; B60W 50/038; B60W 10/26; B60W 10/06; B60W 50/0205; B60W 2710/242; B60W 2710/0644; B60W 20/00; B60L 3/0084; B60L 3/04; Y10S 903/93; F16H 2061/126
USPC ....................................... 701/1, 22
See application file for complete search history.

(56) References Cited

U.S. PATENT DOCUMENTS

| | | | | |
|---|---|---|---|---|
| 7,163,072 B2 * | 1/2007 | Yamaguchi | ............. | B60K 6/26 180/65.24 |
| 7,227,332 B2 * | 6/2007 | Suzuki | .................. | B60L 3/0023 180/65.265 |
| 8,013,548 B2 * | 9/2011 | King | .................... | B60L 11/1868 307/10.1 |
| 8,020,650 B2 * | 9/2011 | Van Maanen | ......... | B60L 3/0046 180/65.265 |

(Continued)

FOREIGN PATENT DOCUMENTS

| | | |
|---|---|---|
| JP | 2006063819 A | 3/2006 |
| JP | 2008007018 A | 1/2008 |

(Continued)

OTHER PUBLICATIONS

Extended European Search Report for European Patent Application No. 16175415, dated Aug. 2, 2017, 7 pages.

*Primary Examiner* — Jaime Figueroa
(74) *Attorney, Agent, or Firm* — Mintz Levin Cohn Ferris Glovsky and Popeo, P.C.; Peter F. Corless (57) ABSTRACT

A control method and apparatus of a hybrid vehicle are provided. The control method includes determining whether the speed of a motor exceeds a first threshold value, when supply of power to a battery is cut off and thus the hybrid vehicle is driven by an engine. The speed is then adjusted to be the first threshold value or less, when the speed exceeds the first threshold value.

13 Claims, 5 Drawing Sheets

(56) References Cited

U.S. PATENT DOCUMENTS

| | | | | |
|---|---|---|---|---|
| 8,631,894 B2* | 1/2014 | Ashida | ................ | B60L 3/0007 180/274 |
| 9,371,074 B1* | 6/2016 | Luehrsen | .............. | B60W 50/02 |
| 9,475,490 B2* | 10/2016 | Youn | .................... | B60W 20/50 |
| 2003/0137275 A1* | 7/2003 | Suzuki | ................ | B60L 3/0023 320/104 |
| 2004/0129465 A1* | 7/2004 | Yamaguchi | .............. | B60K 6/26 180/65.24 |
| 2009/0319109 A1* | 12/2009 | Ando | ...................... | B60K 1/02 701/22 |
| 2010/0090525 A1* | 4/2010 | King | .................. | B60L 11/1868 307/10.1 |
| 2010/0236851 A1* | 9/2010 | Van Maanen | ......... | B60L 3/0046 180/65.265 |
| 2012/0309588 A1* | 12/2012 | Ashida | .................... | B60L 3/04 477/7 |
| 2013/0066510 A1* | 3/2013 | Lasson | .................. | B60L 3/0084 701/22 |
| 2013/0253749 A1* | 9/2013 | Hayashi | ................ | B60K 6/445 701/22 |
| 2016/0031440 A1* | 2/2016 | Youn | .................... | B60W 20/50 701/22 |
| 2017/0136913 A1* | 5/2017 | Yang | .................... | B60L 11/1811 |

FOREIGN PATENT DOCUMENTS

| | | |
|---|---|---|
| JP | 2008-167616 A | 7/2008 |
| JP | 2010241361 A | 10/2010 |
| JP | 2013-159327 A | 8/2013 |
| JP | 2015107786 A | 6/2015 |
| KR | 10-2009-0102896 A | 10/2009 |
| KR | 10-2010-0044416 A | 4/2010 |
| KR | 10-2012-0002317 A | 1/2012 |
| KR | 10-2012-0061391 A | 6/2012 |

* cited by examiner

CONTROL METHOD AND APPARATUS OF HYBRID ELECTRIC VEHICLE

CROSS REFERENCE TO RELATED APPLICATION(S)

This application claims the benefit of Korean Patent Application No. 10-2016-0020656, filed on Feb. 22, 2016, which is hereby incorporated by reference as if fully set forth herein.

BACKGROUND

Field of the Invention

The present invention relates to a hybrid electric vehicle, and more particularly to a control method and apparatus of a hybrid electric vehicle.

Discussion of the Related Art

Hybrid electric vehicles (hereinafter, referred to as "hybrid vehicles") may have various power transmission apparatuses using an engine and a motor as a power source. These power transmission apparatuses include a series type, a parallel type, a power split type, etc. The hybrid vehicle may be driven in an electric vehicle (EV) mode and a hybrid electric vehicle (HEV) mode. The EV mode is a mode in which the vehicle is driven through driving of the motor based on power of a battery.

In addition, when the battery or a power electric (PE) part (e.g., a motor or a generator) fails during operation, to protect the battery/PE part and to prevent a safety accident from occurring due to abnormal operation, an emergency mode (e g, limp-home mode), in which a relay for intermitting power connection of the battery is cut off and the vehicle is driven using power of the engine, is executed. Particularly, when freewheeling of the motor/generator is performed by power of the engine, counter electromotive force occurs. However, when such counter electromotive force is substantial, the battery which may absorb counter electromotive force, is isolated and, thus, for example, inner pressure of a switch (IGBT) of an inverter is increased and the inverter may be burn out.

For example, among parallel type systems, there is a type in which an engine clutch is disposed between an engine and a motor, and a drive shaft is driven by the motor when the engine clutch is open and driven by the engine and the motor when the engine clutch is locked up. In particular, when a driving apparatus of a hybrid vehicle fails, for example, when a battery or a motor is abnormally operated, to prevent damage to main PE parts (e.g., a motor, a low voltage DC-DC (LDC) converter, and a battery) of the hybrid vehicle and other vehicle parts and to prevent a traffic accident from occurring due to abnormal operation of the battery or the motor, the hybrid vehicle performs a driving process in which a main relay connected to the battery is turned off and the engine clutch is connected to use power of the engine.

By connecting the engine clutch, the motor shares one drive shaft connected to the engine with the engine and thus the motor is freewheeled. Particularly, counter electromotive force is generated from the motor by rotation of the drive shaft and the intensity of counter electromotive force may be increased by high-speed rotation of the drive shaft.

In an isolated situation of the battery for absorbing counter electromotive force generated by turning off the main relay, internal voltage of an insulated gate bipolar mode transistor (IGBT) performing a switching function and included in an inverter within the motor is increased by counter electromotive force and, when voltage exceeding an allowable voltage (e.g., internal voltage) is applied, burn-out of the inverter, such as degradation or dielectric breakdown of the inverter, may occur. Therefore, a cooperative control method, in which burn-out of an inverter of a motor (including a hybrid starter generator (HSG)) caused by high-speed rotation is prevented while maintaining the locked-up state between an engine and the motor by an engine clutch in a failure situation of a hybrid vehicle, is required.

SUMMARY

Accordingly, the present invention provides a control method and apparatus of a hybrid electric vehicle that substantially obviate one or more problems due to limitations and disadvantages of the related art. An object of the present invention is to provide a control method and apparatus of a hybrid electric vehicle which controls revolutions per minute (RPM) of an engine to prevent generation of counter electromotive force exceeding internal pressure of an inverter when a battery for absorbing counter electromotive force generated from a motor is isolated from the motor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a control method of a hybrid vehicle may include determining whether the speed of a motor exceeds a first threshold value, when supply of power to a battery is cut off and thus the hybrid vehicle may be driven by an engine, and adjusting the speed to be the first threshold value or less, when the speed exceeds the first threshold value. The determination of whether the speed of the motor exceeds the first threshold value when supply of power to the battery is cut off and thus the hybrid vehicle may be driven by the engine may include cutting off supply of power to the battery by turning off a relay connecting supply of power to the battery when the battery or a power electric part fails.

Further, the cut-off of power supply to the battery by turning off the relay connecting supply of power to the battery when the battery or the power electric part fails may include turning off the relay when pulse width modulation (PWM) control of the motor is turned off. Additionally, the cut-off of power supply to the battery by turning off the relay connecting supply of power to the battery when the battery or the power electric part fails may include turning off the relay when the battery reaches an overcharged state. The adjustment of the speed to be the first threshold value or under when the speed exceeds the first threshold value may include increasing a gear ratio to adjust the speed to be the first threshold value or less, when the speed exceeds the first threshold value.

Further, the gear ratio may represent the ratio of the gears when the output of the engine is converted into a drive force in the transmission. Hybrid vehicle powertrain of the type that does not include the transmission is able to adjust the vehicle speed by the planetary gear. The gear ratio of the power in the split type of a hybrid vehicle having a power train also may be defined as the ratio of the input side revolution number and output-side gear rotating gear. Increase of the gear ratio to adjust the speed to be the first threshold value or under when the speed exceeds the first threshold value may include upshifting a transmission to increase the gear ratio.

The control method may further include increasing the gear ratio to respond to a second accelerator position sensor (APS) value differing from an actually input first APS value, when the speed exceeds the first threshold value. Additionally, the control method may include cutting off fuel supplied to the engine to adjust the speed to be the first threshold value or less, when the speed exceeds a second threshold value greater than the first threshold value. The motor may be a hybrid starter generator (HSG) connected to an engine shaft pulley.

In another aspect of the present invention, a control method of a hybrid vehicle may include determining whether counter electromotive force generated from a motor exceeds a first threshold value, when supply of power to a battery is cut off and thus the hybrid vehicle may be driven by an engine, and adjusting the counter electromotive force to be the first threshold value or less, when the counter electromotive force exceeds the first threshold value.

The determination of whether the counter electromotive force generated from the motor exceeds the first threshold value when supply of power to the battery is cut off and thus the hybrid vehicle may be driven by the engine may include cutting off supply of power to the battery by turning off a relay connecting supply of power to the battery when the battery or a power electric part fails. The adjustment of the counter electromotive force to be the first threshold value or less may include increasing a gear ratio to adjust the counter electromotive force to be the first threshold value or less, when the counter electromotive force exceeds the first threshold value. Increase of the gear ratio to adjust the counter electromotive force to be the first threshold value or less when the counter electromotive force exceeds the first threshold value may include upshifting a transmission to increase the gear ratio.

The control method may further include increasing the gear ratio to respond to a second accelerator position sensor (APS) value differing from an actually input first APS value, when the counter electromotive force exceeds the first threshold value. Additionally, the control method further include cutting off fuel supplied to the engine to adjust the counter electromotive force to be the first threshold value or less, when the counter electromotive force exceeds a second threshold value greater than the first threshold value.

In another aspect of the present invention, a control method of a hybrid vehicle may include turning off a main relay located between a motor and a battery, executing upshifting, when a first RPM of the motor exceeds a first threshold value, and cutting off supply of fuel for driving an engine when the first RPM exceeds a second threshold value greater than the first threshold value.

Turning-off of the main relay may include turning off the main relay, when pulse width modulation (PWM) control of the motor is turned off. Additionally, turning-off of the main relay may include turning off the main relay, when the battery reaches an overcharged state. Execution of upshifting when the first RPM exceeds the first threshold value may include executing upshifting based on a predetermined accelerator position sensor (APS) signal. The motor may be a hybrid starter generator (HSG) connected to an engine shaft pulley.

In another aspect of the present invention, a control method of a hybrid vehicle may include monitoring, by a first controller, a first RPM of a first motor and a second RPM of a second motor, transmitting, by the first controller, a first engine RPM limiting signal to a second controller when the first RPM exceeds a first threshold value or the second RPM exceeds a second threshold value, and a second engine RPM limiting signal to a fourth controller when the first RPM exceeds a third threshold value, operating, by the second controller, a third controller to execute upshifting, when a main relay is in an off state and the second controller receives the first engine RPM limiting signal, and stopping, by the fourth controller, supply of fuel for driving an engine, when the main relay is in the off state and the fourth controller receives the second engine RPM limiting signal, wherein the main relay may be disposed between the first motor and a battery and the third threshold value is greater than the first threshold value.

The control method may further include executing, by a fifth controller, turning-on/off of the main relay and monitoring whether the main relay is in the off state. The control method may also include turning off, by the first controller, PWM control of the first motor or the second motor, or turning off, by the fifth controller, the main relay when the battery reaches an overcharged state. The second motor may be a hybrid starter generator (HSG) connected to an engine shaft pulley.

The operation of the third controller to execute upshifting may include transmitting, by the second controller, a predetermined accelerator position sensor (APS) signal to the third controller to operate the third controller to execute upshifting, when the main relay is in the off state and the second controller receives the first engine limiting signal. The control method may further include transmitting, by the second controller, the APS signal to the third controller, when the main relay is in the off state and the second controller receives the first engine limiting signal.

The control method may further include transmitting, by the second controller, an engine torque signal to the fourth controller and driving, by the fourth controller, the engine based on the engine torque signal. Monitoring of the first RPM of the first motor and the second RPM of the second motor by the first controller may include monitoring, by the first controller, whether the first RPM of the first motor exceeds the first threshold value or the third threshold value and whether the second RPM of the second motor exceeds the second threshold value.

In another aspect of the present invention, a vehicle control system may include a first controller configured to monitor a first RPM of a first motor and a second RPM of a second motor, to transmit a first engine RPM limiting signal when the first RPM exceeds a first threshold value or the second RPM exceeds a second threshold value, and to transmit a second engine RPM limiting signal when the first RPM exceeds a third threshold value, a second controller configured to transmit a predetermined APS signal when a main relay is in an off state and the second controller receives the first engine RPM limiting signal from the first controller, a third controller configured to execute upshifting when the third controller receives the APS signal, and a fourth controller configured to stop supply of fuel for driving an engine when the main relay is in the off state and the fourth controller receives the second engine RPM limiting signal from the first controller, wherein the main relay may be disposed between the first motor and a battery and the third threshold value may be greater than the first threshold value. The various controllers discussed herein may be operated by a single controller (e.g., upper controller).

The vehicle control system may further include a fifth controller configured to execute turning-on/off of the main relay and to monitor whether the main relay is in the off state. The first controller may be configured to drive the first motor and the second motor. The first controller may further be configured to turn off the PWM control of the first motor or the second motor, or the fifth controller may be configured to turn off the main relay when the battery reaches an overcharged state. The second motor may be a hybrid starter generator (HSG) connected to an engine shaft pulley. The second controller may be configured to transmit an engine torque signal to the fourth controller, and the fourth controller may be configured to drive the engine based on the engine torque signal.

In another aspect of the present invention, a computer readable recording medium is provided for recording a program for executing the above-described control method.

In yet another aspect of the present invention, a vehicle control system may include a first controller configured to monitor first counter electromotive force generated from a first motor and second counter electromotive force generated from a second motor, to transmit a first engine RPM limiting signal when the first counter electromotive force exceeds a first threshold value or the second counter electromotive force exceeds a second threshold value, and to transmit a second engine RPM limiting signal when the first counter electromotive force exceeds a third threshold value, a second controller configured to transmit a predetermined APS signal when a main relay is in an off state and the second controller receives the first engine RPM limiting signal from the first controller, a third controller configured to execute upshifting when the third controller receives the APS signal, and a fourth controller configured to stop supply of fuel for driving an engine when the main relay is in the off state and the fourth controller receives the second engine RPM limiting signal from the first controller, wherein the main relay may be disposed between the first motor and a battery and the third threshold value may be greater than the first threshold value.

The vehicle control system may further include a fifth controller configured to execute the turning-on/off of the main relay and to monitor whether the main relay is in the off state. The first controller may be configured to drive the first motor and the second motor. The first controller may further be configured to turn off the PWM control of the first motor or the second motor, or the fifth controller may be configured to turn off the main relay when the battery reaches an overcharged state. The second motor may be a hybrid starter generator (HSG) connected to an engine shaft pulley. The second controller may be configured to transmit an engine torque signal to the fourth controller, and the fourth controller may be configured to drive the engine based on the engine torque signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. The suffixes "module" and "unit" used in the description below are given or used together only in consideration of ease in preparation of the specification and do not have distinctive meanings or functions.

In the following description of the present invention, a detailed description of known functions and configurations incorporated herein will be omitted when it may make the subject matter of the present invention rather unclear. The present invention relates to fail safe reaction which may be used in a hybrid vehicle. More particularly, the present invention relates a control method of a hybrid vehicle for fail safe reaction which may prevent sudden stoppage of the hybrid vehicle, protect a driver and passengers and move the vehicle to a safe location when a battery or a motor fails or control of the battery or the motor is disabled during driving of the vehicle.

Since a hybrid vehicle may fail during driving, the hybrid vehicle should secure a driving method executed in response to a failure and ensure safety for a driver. The hybrid vehicle uses an engine and a motor as a power source and may thus be driven using power of the engine when the motor (an internal inverter) of an electric power system fails. For example, the hybrid vehicle may enter an emergency driving mode, i.e., a limp-home mode (failure mode or minimum driving mode), to move to a nearby repair shop.

The limp-home mode may be executed even when the battery or the motor is abnormally operated and, in the limp-home mode, a high voltage main relay (M/R) may be turned off to isolate the battery, an engine clutch may be connected and thus the vehicle may be driven using power of the engine. Damage to the inverter which may be generated in the limp-home mode will be described in detail with reference to FIG. 1, and a method for protecting the inverter in accordance with one exemplary embodiment will be described with reference to FIGS. 2 to 6.

Figure 1:
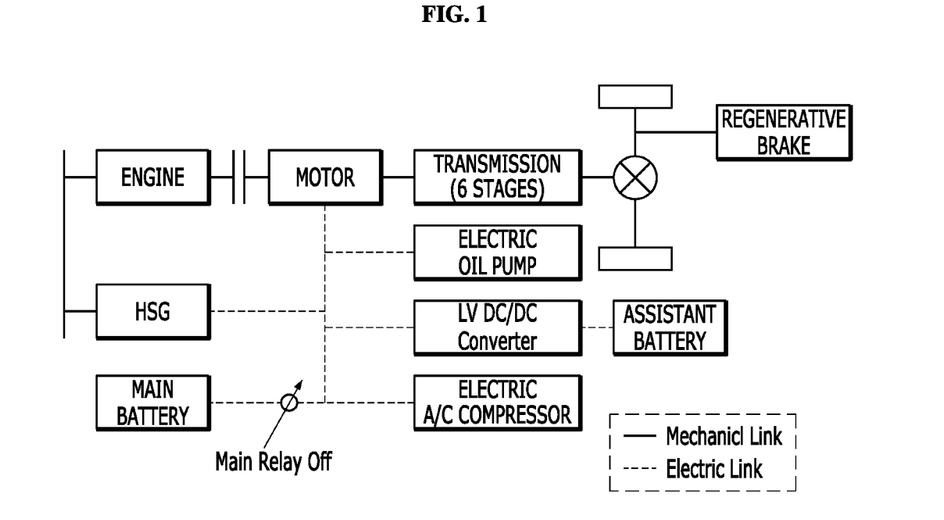
FIG. 1 is a block diagram illustrating a control system of a hybrid electric vehicle in accordance with one exemplary embodiment of the present invention.

FIG. 1 is a block diagram illustrating a control system of a hybrid vehicle in accordance with one exemplary embodiment of the present invention. One example of a power train of a hybrid vehicle will be described with reference to FIG. 1. In particular, an engine clutch may be disposed between an engine and a motor and may selectively interconnect the engine and the motor based on driving modes of the hybrid vehicle.

Further, an electric oil pump may be configured to supply hydraulic pressure for operating a transmission and the engine clutch regardless of vehicle driving modes, instead of a mechanical oil pump mounted in a conventional engine. The hybrid vehicle may include a driving motor (hereinafter, referred to as a "motor") and a hybrid starter generator (hereinafter, referred to as a "HSG"). The motor may be configured to transmit power to the vehicle, and the HSG may be connected to an engine shaft pulley to start the engine and generate power. The two motors together with the engine may be configured to supply power to the hybrid vehicle and may operate as a generator ton convert mechanical energy of the engine into electrical energy.

A low voltage direct-current (DC)-DC converter (LDC) instead of a conventional alternator may be in charge of assistant battery charging and, the engine may be stopped in the EV mode and thus, an electric compressor rather than a conventional engine belt-type compressor may be used to operate an air conditioner. A main battery (hereinafter, referred to as a "battery") may be connected to the motor and other parts via a main relay. By turning on the main relay, output voltage of the battery may be supplied to the motor and, on the other hand, power generated from the motor may charge the battery.

Even when the battery or the motor is abnormally operated, the limp-home mode may be executed and, in the limp-home mode, an operation, in which the high voltage main relay is turned off to perform control for isolating the failed battery or for preventing driving of the failed motor, the engine clutch is connected and thus the vehicle is driven using power of the engine, may be executed. In the limp-home mode, pulse width modulation (PWM) control of the failed motor may be turned off, and the motor shares a drive shaft with the engine and is freewheeled by rotation of the drive shaft. The HSG connected to the engine shaft pulley may be freewheeled in proportion to rotation of the engine (a pulley ratio). Particularly, in an isolated situation of the battery for absorbing counter electromotive force generated by turning off the main relay, internal voltage of an insulated gate bipolar mode transistor (IGBT) performing a switching function and included in an inverter within the motor may be increased and, when voltage exceeding an allowable voltage (internal voltage) is applied, burn-out of the inverter, such as degradation or dielectric breakdown of the inverter, may occur.

The present invention provides a method for preventing burn-out of the inverter within the motor (including the HSG) by high-speed rotation when the high voltage main relay is turned off due to a failure of the vehicle control system or difficulty in control of the motor (including the HSG) and the engine is driven through connection of the engine clutch.

Figure 2:
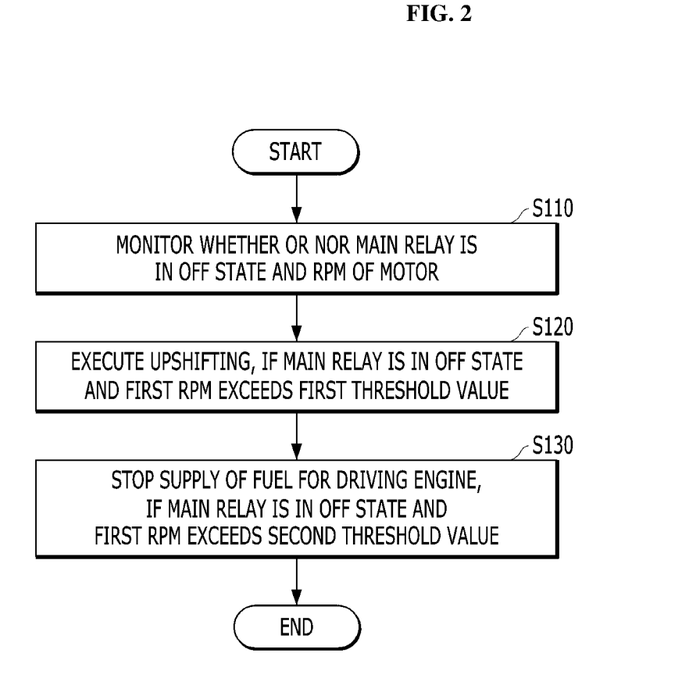
FIG. 2 is a flowchart illustrating a control method of a hybrid electric vehicle in accordance with one exemplary embodiment of the present invention.

FIG. 2 is a flowchart illustrating a control method of a hybrid electric vehicle in accordance with one exemplary embodiment of the present invention. The present invention may be executed when a hybrid vehicle is driven in the limp-home mode (e.g., in an abnormal state of a motor or a battery) and when the motor and an engine are locked up in the limp-home mode.

With reference to FIG. 2, a vehicle control apparatus operated by a controller may be configured to monitor whether a main relay is in an off state and a first RPM of the motor (Operation S110). The motor may include a driving motor and also an HSG and the vehicle control apparatus may be configured to respectively monitor RPM of the motor and RPM of the HSG.

Further, the vehicle control apparatus may be configured to execute upshifting, when the main relay is in the off state and the first RPM exceeds a first threshold value (Operation S120). The main relay may be turned off in the limp-home mode. For example, when pulse width modulation (PWM) control of the motor is turned off, or the main relay may be turned off when the battery reaches an overcharged state.

When upshifting is performed, the RPM of the engine may be decreased and the intensity of counter electromotive force generated from the motor sharing the drive shaft with the engine may be decreased by decrease in the RPM of the engine. When the RPM of the drive shaft is decreased, the intensity of counter electromotive force generated from the motor may be decreased. Accordingly, the vehicle control apparatus may be configured to adjust the intensity of counter electromotive force generated from the motor to be less than voltage which does not generate burn-out of the inverter within the motor.

Upshifting may be executed by a predetermined accelerator position sensor (APS) signal. A value of the APS signal may vary based on an engagement degree of an accelerator pedal (e.g., the amount of pressure exerted onto the pedal by a driver) and gear shifting may be determined based on the APS signal. The vehicle control apparatus may be configured to stop the supply of fuel for driving the engine, when the main relay is in the off state and the first RPM of the motor exceeds a second threshold value greater than the first threshold value (Operation S130). When the increase in the RPM of the engine is maintained even though upshifting is executed or when the limp-home mode is executed at a highest gear provided by the transmission, it may be impossible to further shift to a higher gear and thus the RPM of the engine may be decreased by stopping supply of fuel for driving the engine.

Particularly, the vehicle control apparatus is an apparatus configured to generally operate the motor, the engine and the transmission. For example, the vehicle control apparatus may be a hybrid control unit (hereinafter, referred to as an "HCU"). The HCU, which is a main arithmetic processing unit of hybrid vehicles, may be configured to transmit and receive speed and torque information to and from respective controllers, such as a motor control unit (MCU), an engine management system (EMS), a transmission control unit (TCU), and a battery management system (BMS), distribute driving force of the vehicle and execute vehicle driving modes.

As an example, the vehicle control apparatus may be configured to prevent burn-out of the motor by comparing the speed (RPM) of the motor with the first threshold value and the second threshold value and also may be configured to prevent burn-out of the motor by monitoring counter electromotive force generated from the motor and comparing the counter electromotive force with reference threshold values.

Figure 3:
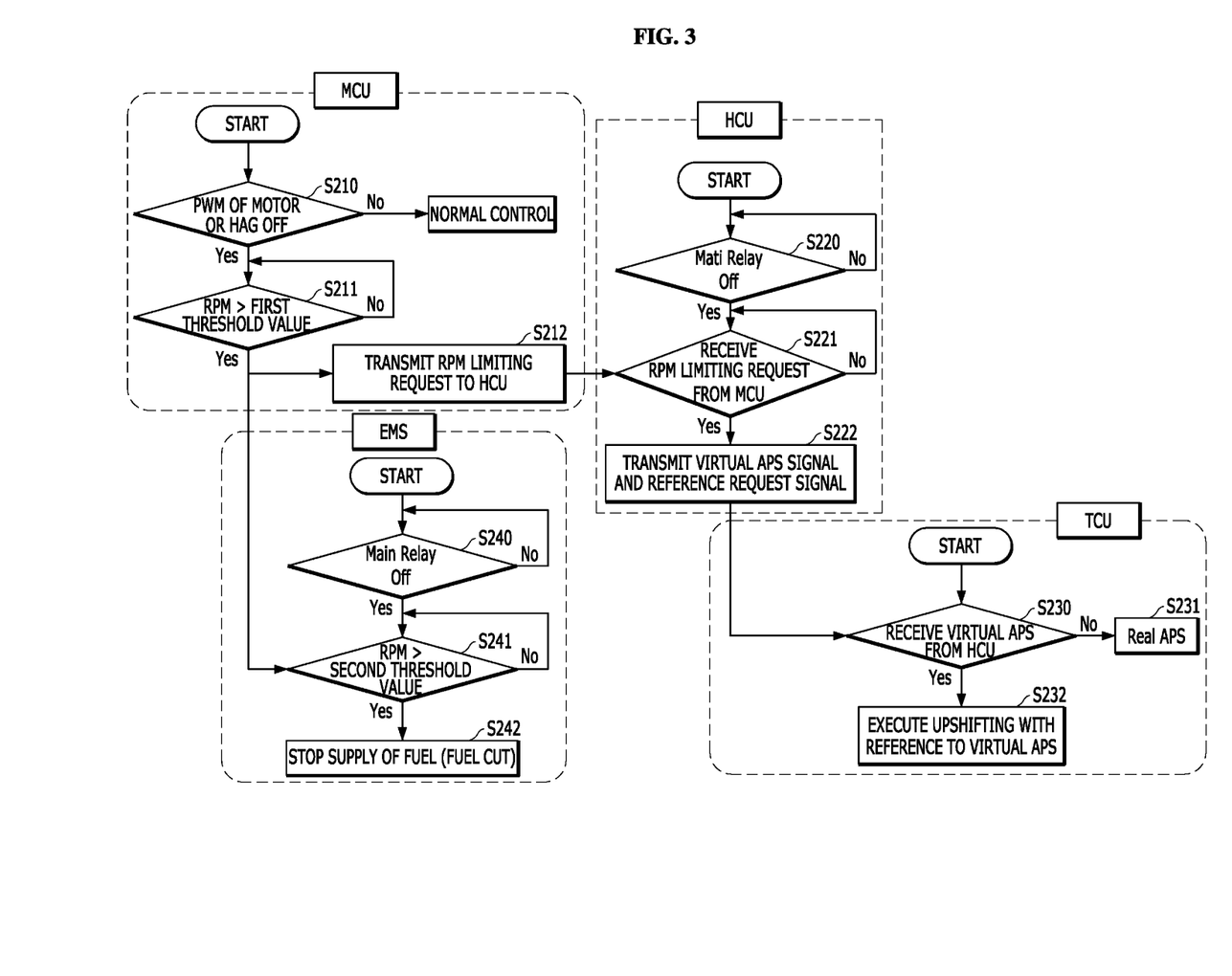
FIG. 3 is a flowchart illustrating a control method performed by respective controllers included in the vehicle control system in accordance with one exemplary embodiment of the present invention.

FIG. 3 is a flowchart illustrating a vehicle control method performed by respective controllers within the vehicle control system in accordance with one exemplary embodiment of the present invention. With reference to FIG. 3, the vehicle control method may be executed under cooperative control of the HCU, the MCU, the EMS and the TCU.

Hereinafter, general functions of these elements will be described. The EMS may be configured to adjust output of the engine, the TCU may be configured to receive output information of a power source and execute gear shifting, the MCU may be configured to transmit motor torque instructions, generate power, and recognize control disabled states and rotation speeds of the motor and the HSG, and the HCU may be configured to transmit transmission and engine torque instructions of the hybrid vehicle to operate other controllers.

The MCU may be configured to recognize the control disabled states (abnormal states) of the motor and the HSG and turn off PWM control of the motor and the HSG (Operation S210). In particular, PWM control is a method in which the RPMs, i.e., the rotation speeds, of the motor and the HSG are adjusted using a frequency of a constant cycle.

The MCU may be configured to turn off PWM control in the abnormal states of the motor and the HSG to allow the hybrid vehicle to be driven by the engine. When the RPM of the motor exceeds a first threshold value by rotation of the engine in the off state of PWM control of the motor and the HSG (Yes in Operation S211), the MCU may be configured to transmit a first engine RPM limiting signal to the HCU (Operation S212).

In the off state of the main relay interconnecting the battery and the motor (Yes in Operation S220), when the HCU receives the first engine RPM limiting signal from the MCU (Yes in Operation S221), the HCU may be configured to transmit a virtual APS signal and a reference request signal, which are predetermined, to the TCU (Operation S222). When the TCU receives the virtual APS signal from the HCU (Yes in Operation S230), the TCU may be configured to execute upshifting with reference to the APS signal (Operation S232).

The RPM of the engine may be decreased by executing upshifting and, in a shift state to the highest gear allowable in the hybrid vehicle, the RPM of the motor may exceed the second threshold value which may be greater than the first threshold value. When the RPM of the motor exceeds the second threshold value (Yes in Operation S241), the MCU may be configured to transmit a second engine RPM limiting signal to the EMS. When the EMS receives the second engine RPM limiting signal from the MCU in the off state of the main relay (Yes in Operation S240), the EMS may be configured to stop or terminate the supply of fuel for driving the engine (Operation S242).

The EMS may be configured to prevent increase in the RPM of the engine by stopping supply of fuel, thus preventing increase in counter electromotive force generated from the motor. As an example, although the EMS may not receive the second engine RPM limiting signal from the MCU, when the MCU monitors the RPM of the motor (including the HSG) and thus recognizes that the first RPM of the motor exceeds the second threshold value, the supply of fuel may be stopped.

Figure 4:
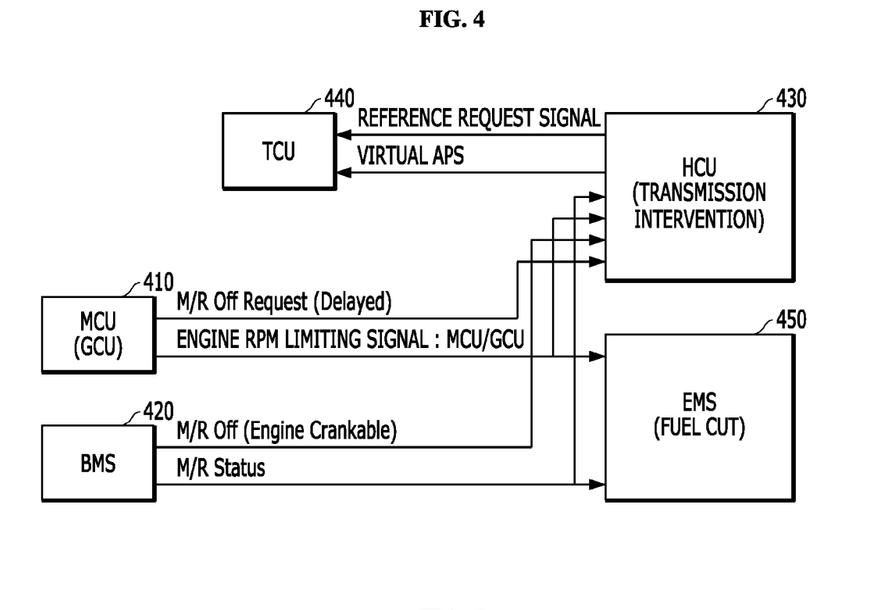
FIG. 4 is a block diagram illustrating the respective controllers included in the vehicle control system in accordance with one exemplary embodiment of the present invention.

FIG. 4 is a block diagram illustrating the respective controllers included in the vehicle control system in accordance with one exemplary embodiment of the present invention. With reference to FIG. 4, when the limp-home mode is executed, the MCU 410 may be configured to turn off PWM control and transmit a main relay off request to the HCU 430. The HCU 430 may be configured to operate the BMS 420 to turn off the main relay in response receiving the main relay off request, or operate the BMS 420 to turn off the main relay after a designated period of time (M/R off request (delayed)).

The MCU 410 may be configured to monitor the RPM of the motor (including the HSG) after the main relay off request. When the RPM of the motor exceeds the first threshold value or the second threshold value during the monitoring, to reduce the intensity of counter electromotive force generated from the motor, the MCU 410 may be configured to transmit an engine RPM limiting signal to the HCU 430 or the EMS 450.

Since there is a possibility that the battery explodes due to overcharging, overheating and external impact, the BMS 420 may be configured to operate and manage the battery. In general, the BMS 420 may be separately mounted in a large capacity battery and may also be mounted within an electric vehicle. The BMS 420 may be configured to monitor the state of the battery indicated by various types of information. The information indicating the state of the battery may include voltage of the battery, temperature of the battery, a state of charging of the battery, a state of health of the battery, an air flow, an input/output state of current, etc. Further, the BMS 420 may be configured to execute calculation required for power supply to the battery based on the above-described information, and be connected to external apparatuses to transmit/receive various types of information to/from the external apparatuses via communication (e.g., controller area network communication or the like). Although one exemplary embodiment of the present invention employs the BMS as a system for managing and controlling the battery and for turning on/off the main relay, such a system is not limited to the BMS.

Furthermore, the BMS 420 may be configured to receive the main relay off request from the HCU 430 and then turn off the main relay, or turn off the main relay based on self-judgment and inform the HCU 430 or the EMS 450 of the state of the main relay. For example, when the battery reaches an overcharged state, the BMS 420 may be configured to turn off the main relay and inform the HCU 430 or the EMS 450 of the state of the main relay (M/R off (engine crankable).

The HCU 430 may operate as a main controller in the limp-home mode executed when the hybrid vehicle fails, and may be configured to transmit and receive signals and information to execute cooperative control of the MCU 410, the EMS 450 and the TCU 440. When the HCU 430 receives the engine RPM limiting signal from the MCU 410, the HCU 430 may be configured to transmit a virtual APS signal to the TCU 440 to execute upshifting, and thus decrease the RPM of the engine.

The TCU 440 may be configured to execute upshifting that corresponds to the virtual APS signal received from the HCU 430. The EMS 450 may be configured to receive whether the main relay is in the off state from the BMS 420, receive the engine RPM limiting signal from the MCU 410, and cut off supply of fuel for driving the engine to decrease the RPM of the engine when the RPM of the motor exceeds the second threshold value.

Figure 5:
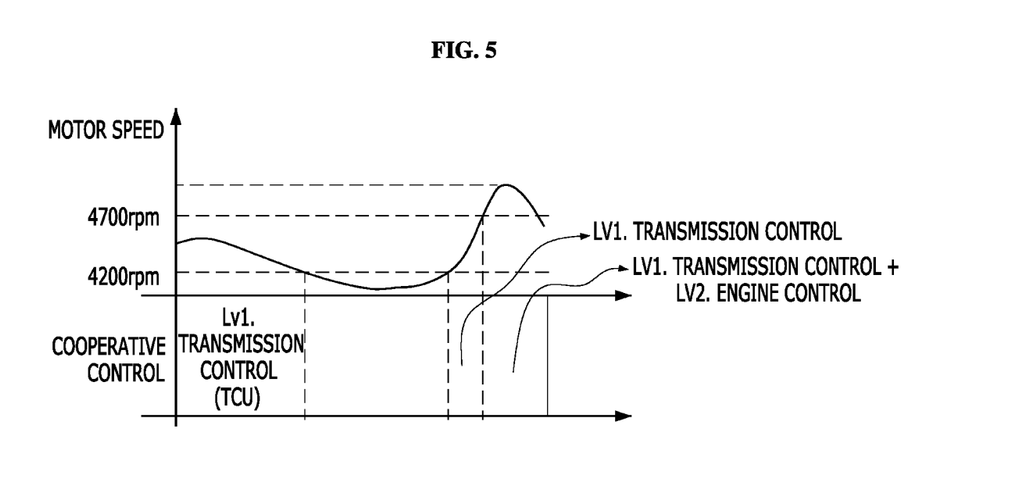
FIG. 5 is a graph illustrating a first threshold value and a second threshold value in the control method in accordance with one exemplary embodiment of the present invention.

FIG. 5 is a graph illustrating a first threshold value and a second threshold value in the control method in accordance with one exemplary embodiment of the present invention. With reference to FIG. 5, cooperative control to execute the vehicle control method varies according to the RPM of the motor, the first threshold value and the second threshold value. For example, the first threshold value may be about 4200 RPM and the second threshold value may be about 4700 RPM.

When the RPM of the motor is greater than the first threshold value and less than the second threshold value, it may be possible to operate the motor to run at lower RPM than the first threshold value by executing upshifting by the TCU. However, when the RPM of the motor is greater than the second threshold value, the TCU may be configured to autonomously execute upshifting and the EMS may be configured to cut off supply of fuel to the engine separately from execution of upshifting by the TCU, thereby decreasing the RPM of the engine. When the RPM of the motor is greater than the second threshold value even though upshifting is executed when the RPM of the motor reaches the first threshold value which may be less than the second threshold value may be a situation in which the limp-home mode is executed at a highest gear available in the vehicle and thus further upshifting may be impossible.

Figure 6:
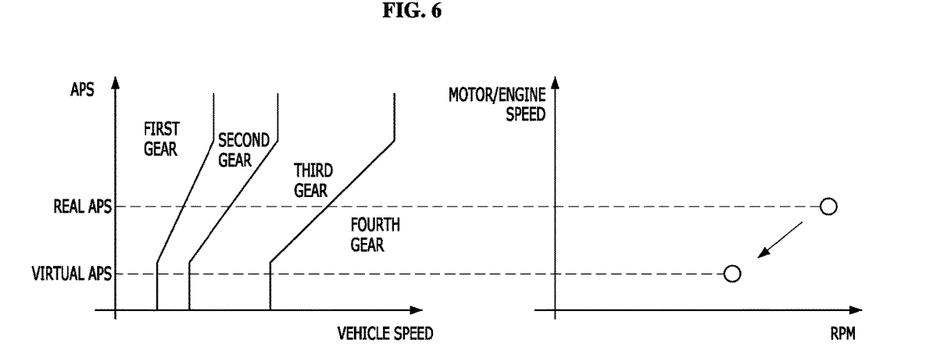
FIG. 6 is a graph illustrating accelerator position sensor (APS) signals in the control method in accordance with one exemplary embodiment of the present invention.

FIG. 6 is a graph illustrating accelerator position sensor (APS) signals in the vehicle control method in accordance with one exemplary embodiment of the present invention. With reference to FIG. 6, a gear position may be varied based on the speeds and APS signals of the vehicle.

The TCU may be configured to execute gear shifting based on a real APS signal based on an engagement degree of the accelerator pedal in the normal driving mode (e.g., not in the limp-home mode). However, in the limp-home mode, when the TCU receives a virtual APS signal together with a reference request signal from the HCU, the TCU may be configured to execute gear shifting based on the virtual APS signal. The HCU may be configured to transmit an APS signal less than the real APS signal to the TCU and thus operate the TCU to execute upshifting, and the RPM of the engine may be decreased by upshifting.

The method in accordance with the above-described exemplary embodiment may be implemented as a computer executable program and stored in a computer readable recording medium which. The computer readable recording medium may be one of a ROM, a RAM, a CD-ROM, a magnetic tape, a floppy disk, an optical data storage device, etc. Further, the computer readable recording medium may be realized in the form of a carrier wave (for example, transmission over the Internet).

The computer readable recording medium may be distributed to computer systems connected by a network and be stored and executed as code which is readable by computers in a distributed manner. Further, functional programs, code and code segments to implement the above-described method may be easily deduced by programmers in the art to which the exemplary embodiments pertain.

As apparent from the above description, a control method and apparatus of a hybrid electric vehicle in accordance with the present invention have effects, as follows.

First, only the RPM of the engine may be adjusted while maintaining the driving state of the engine when a relay of a battery of the hybrid electric vehicle is turned off, thereby providing a stable limp-home mode and thus preventing traffic accidents.

Second, the intensity of counter electromotive force generated from a motor may be adjusted by changing the RPM of the engine, thereby preventing burn-out of an inverter within the motor.

Third, a logic alone may be changed using sensor information mounted in conventional vehicles without installation of additional parts, thereby causing cost reduction.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A control method of a hybrid vehicle, comprising:
    determining, by a controller, whether a speed of a motor exceeds a first threshold value, when supply of power to a battery is cut off and the hybrid vehicle is driven by an engine;
    adjusting, by the controller, the speed to be the first threshold value or less, when the speed exceeds the first threshold value; and
    cutting off, by the controller, fuel supplied to the engine to adjust the speed to be the first threshold value or less, when the speed exceeds a second threshold value greater than the first threshold value,
    wherein the speed adjustment to be first threshold value or less includes increasing, by the controller, a gear ratio to adjust the speed to be the first threshold value or less, when the speed exceeds the first threshold value and increasing the gear ratio to respond to a second accelerator position sensor (APS) value differing from an actually input first APS value, when the speed exceeds the first threshold value.

2. The control method according to claim 1, wherein determination of whether the speed of the motor exceeds the first threshold value includes cutting off supply of power to the battery by turning off a relay connecting supply of power to the battery when the battery or a power electric part fails.

3. The control method according to claim 2, wherein the cut-off of supply of power to the battery by turning off the relay connecting supply of power to the battery when the battery or the power electric part fails includes turning off the relay when pulse width modulation (PWM) control of the motor is turned off.

4. The control method according to claim 2, wherein the cut-off of supply of power to the battery by turning off the relay connecting supply of power to the battery when the battery or the power electric part fails includes turning off the relay when the battery reaches an overcharged state.

5. The control method according to claim 1, wherein the increase of the gear ratio to adjust the speed to be the first threshold value or less when the speed exceeds the first threshold value includes upshifting a transmission to increase the gear ratio.

6. The control method according to claim 1, wherein the motor is a hybrid starter generator (HSG) connected to an engine shaft pulley.

7. A control method of a hybrid vehicle, comprising:
determining, by a controller, whether counter electromotive force generated from a motor exceeds a first threshold value, when supply of power to a battery is cut off and the hybrid vehicle is driven by an engine;
adjusting, by the controller, the counter electromotive force to be the first threshold value or less, when the counter electromotive force exceeds the first threshold value; and
cutting off, by the controller, fuel supplied to the engine to adjust the counter electromotive force to be the first threshold value or less, when the counter electromotive force exceeds a second threshold value that is greater than the first threshold value,
wherein the counter electromotive force adjustment includes increasing, by the controller, a gear ratio to adjust the counter electromotive force to be the first threshold value or less, when the counter electromotive force exceeds the first threshold value and increasing the gear ratio to respond to a second accelerator position sensor (APS) value differing from an actually input first APS value, when the counter electromotive force exceeds the first threshold value.

8. The control method according to claim 7, wherein determination of whether the counter electromotive force generated from the motor exceeds the first threshold value when supply of power to the battery is cut off and the hybrid vehicle is driven by the engine includes cutting off supply of power to the battery by turning off a relay connecting supply of power to the battery when the battery or a power electric part fails.

9. The control method according to claim 7, wherein the increase of the gear ratio to adjust the counter electromotive force to be the first threshold value or less when the counter electromotive force exceeds the first threshold value includes upshifting a transmission to increase the gear ratio.

10. A control method of a hybrid vehicle, comprising:
turning off, by a controller, a main relay disposed between a motor and a battery;
executing upshifting, by the controller, when a first revolutions per minute (RPM) of the motor exceeds a first threshold value; and
cutting off, by the controller, supply of fuel for driving an engine when the first RPM exceeds a second threshold value that is greater than the first threshold value,
wherein execution of upshifting when the first RPM exceeds the first threshold value includes executing upshifting based on a predetermined accelerator position sensor (APS) signal.

11. The control method according to claim 10, wherein the turning-off of the main relay includes turning off the main relay, when pulse width modulation (PWM) control of the motor is turned off.

12. The control method according to claim 10, wherein the turning-off of the main relay includes turning off the main relay, when the battery reaches an overcharged state.

13. The control method according to claim 10, wherein the motor is a hybrid starter generator (HSG) connected to an engine shaft pulley.

* * * * *